United States Patent
Stark et al.

(10) Patent No.: US 12,281,664 B2
(45) Date of Patent: Apr. 22, 2025

(54) DUCT ARRANGEMENT AND METHOD

(71) Applicant: BAE SYSTEMS plc, London (GB)

(72) Inventors: Callum Stark, Glasgow (GB); Weichao Shi, Glasgow (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 18/568,433

(22) PCT Filed: Jun. 23, 2022

(86) PCT No.: PCT/GB2022/051596
§ 371 (c)(1),
(2) Date: Dec. 8, 2023

(87) PCT Pub. No.: WO2023/275516
PCT Pub. Date: Jan. 5, 2023

(65) Prior Publication Data
US 2024/0295230 A1  Sep. 5, 2024

(30) Foreign Application Priority Data

Jun. 28, 2021 (EP) ..................................... 21275089
Jun. 28, 2021 (GB) ..................................... 2109275

(51) Int. Cl.
*B63H 1/18* (2006.01)
*B63H 1/16* (2006.01)
(Continued)

(52) U.S. Cl.
CPC ............. *F15D 1/0015* (2013.01); *B63H 1/18* (2013.01); *B63H 5/14* (2013.01); *B64C 11/001* (2013.01); *B64C 11/18* (2013.01); *B64C 23/06* (2013.01)

(58) Field of Classification Search
CPC ....... B64C 11/001; B64C 11/18; B64C 23/06; B63H 1/18; B63H 5/14; B63H 1/16; B63H 2001/185
See application file for complete search history.

(56) References Cited

U.S. PATENT DOCUMENTS

2011/0274533 A1* 11/2011 Presz, Jr. .................. F03D 1/04
                                                    415/208.2
2013/0164488 A1    6/2013 Wood et al.
(Continued)

FOREIGN PATENT DOCUMENTS

CN    105736425 A    7/2016
CN    106762780 A    5/2017
(Continued)

OTHER PUBLICATIONS

International Search Report and Written Opinion received for PCT/GB2022/051596. Mailed: Aug. 30, 2022. 12 pages.
(Continued)

*Primary Examiner* — David E Sosnowski
*Assistant Examiner* — Maxime M Adjagbe
(74) *Attorney, Agent, or Firm* — Finch & Maloney PLLC

(57) ABSTRACT

According to the present disclosure there is provided a duct arrangement for influencing fluid flow, the duct arrangement comprising: a duct section arranged to receive a fluid flow therethrough, the duct section defining a first direction through the duct section from a fluid inlet end to a fluid outlet end; a rotor housed in the duct section, the rotor comprising one or more rotor blades; and a vortex generator surface housed in the duct section, the vortex generator surface arranged to induce vortices in the fluid flow through the duct section.

18 Claims, 11 Drawing Sheets

(51) Int. Cl.
*B63H 5/14* (2006.01)
*B64C 11/00* (2006.01)
*B64C 11/18* (2006.01)
*B64C 23/06* (2006.01)
*F15D 1/00* (2006.01)

(56) References Cited

U.S. PATENT DOCUMENTS

2013/0266439 A1  10/2013  Rubak et al.
2016/0052621 A1   2/2016  Ireland et al.

FOREIGN PATENT DOCUMENTS

| | | |
|---|---|---|
| CN | 107117277 A | 9/2017 |
| CN | 107662693 A | 2/2018 |
| DE | 19634296 A1 | 4/1997 |
| FR | 3082237 A1 | 12/2019 |
| GB | 2034435 A | 6/1980 |
| GB | 2579137 A | 6/2020 |
| JP | S60121192 A | 6/1985 |
| WO | 2014114988 A1 | 7/2014 |
| WO | 2018139234 A1 | 8/2018 |
| WO | 2021116591 A1 | 6/2021 |
| WO | 2023275516 A1 | 1/2023 |

OTHER PUBLICATIONS

GB Search Report under Section 17(5) received for GB Application No. 2109275.4, dated Mar. 31, 2022. 4 pages.
Extended European Search Report received for EP Application No. 21275089.7, dated Dec. 13, 2021. 10 page.

\* cited by examiner

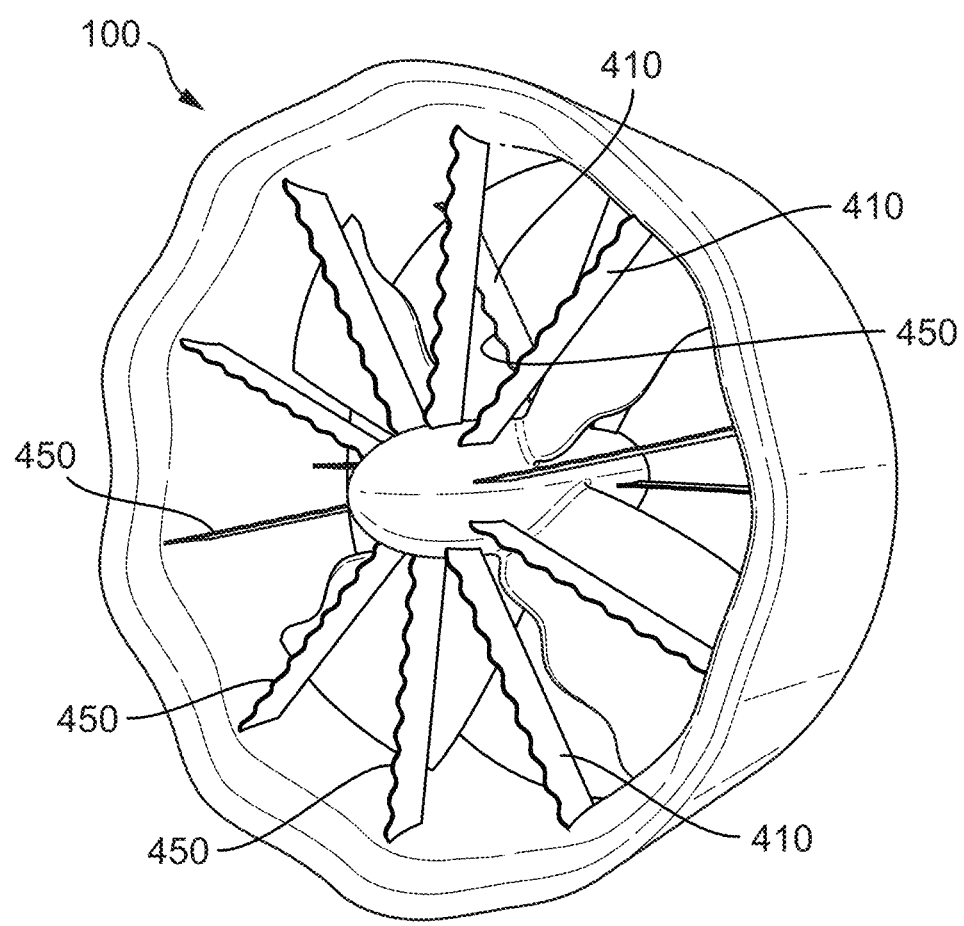

DUCT ARRANGEMENT AND METHOD

FIELD

The present invention relates to duct arrangements for influencing fluid flow, or specifically liquid flow, and associated crafts and methods.

BACKGROUND

Aircraft and watercraft comprise components which are exposed to, or make use of, fluid flows. Certain components are configured to interact with, including guide, the fluid flows to facilitate the production of thrust or lift. Increasing or maintaining the magnitude of thrust or lift produced, whilst using an equivalent or lower quantity of fuel, is important in reducing fuel costs and carbon emissions. Thus, techniques for improving fluid interaction with craft components are of interest in the field.

The interaction of craft components with fluid flows results in a region of disturbed flow (often turbulent) downstream of the craft, known as a wake. Often, craft must maintain a safe distance so as not to be disturbed by the wake. Techniques for reducing or otherwise influencing the wake are of interest in the field.

The interaction of craft components with fluid flows results in noise. Techniques for reducing or otherwise influencing the noise are of interest in the field, for example to reduce disturbance to aquatic life in the field of watercraft, or to reduce environmental noise in the field of aircraft.

It is an object of the present invention to provide an improved arrangement and/or method thereof and/or address one or more of the problems discussed above, or discussed elsewhere, or to at least provide an alternative arrangement and/or method.

SUMMARY

According to a first aspect of the present invention, there is provided a duct arrangement for influencing fluid flow, the duct arrangement comprising: a duct section arranged to receive a fluid flow therethrough, the duct section defining a first direction through the duct section from a fluid inlet end to a fluid outlet end; a rotor housed in the duct section, the rotor comprising one or more rotor blades; and a vortex generator surface housed in the duct section, the vortex generator surface arranged to induce vortices in the fluid flow through the duct section.

In one example, the vortex generator surface is provided on one or more of the one or more rotor blades.

In one example, the vortex generator surface is provided at or on the leading edge of the one or more rotor blades.

In one example, the vortex generator surface is provided at or on the trailing edge of the one or more rotor blades.

In one example, the vortex generator surface is provided upstream of the rotor along the first direction.

In one example, the vortex generator surface is provided on one or more stator blades.

In one example, the vortex generator surface comprises a series of projections.

In one example, the duct section is a first duct section, and the vortex generator surface is a first vortex generator surface, the duct arrangement comprising: a second duct section defining a second direction through the second duct section from a fluid inlet end to a fluid outlet end, the second duct section comprising a second vortex generator surface, wherein the second vortex generator surface is arranged to induce vortices in the fluid flow through the first duct section.

In one example, the second vortex generator surface is in the form of a ring. In one example, the vortex generator is in the form of a ring of projections.

In one example, the second duct section is attached to, supported by and/or is formed integrally with, the first duct section.

In one example, a duct section, a rotor blade and/or a stator blade are selectively configurable to provide the first and/or second vortex generator surface to induce vortices in the fluid flow. In one example, a section of the duct section, a section of the rotor blade and/or a section of the stator blade is selectively configurable to provide the first and/or second vortex generator surface to induce vortices in the fluid flow.

In one example, the duct section is a first duct section, the rotor blade comprises a first rotor blade section and/or the stator blade comprises a first stator blade section, the duct arrangement comprising a second duct section, a second rotor blade section and/or a second stator blade section, wherein the first section and second section are moveable relative to one another to provide the first and/or second vortex generator surface.

In one example, the first section is movable away from and/or toward the second section, for example, wherein the first section is extendable from and/or retractable into the second section.

According to a second aspect of the present invention there is provided an aircraft or watercraft comprising the duct arrangement according to the first aspect.

According to a third aspect of the present invention there is provided a method of influencing fluid flow, the method comprising: providing a duct arrangement comprising a duct section, a rotor and a vortex generator surface housed in the duct section; generating vortices in a fluid flow using the vortex generator surface; and receiving the fluid flow through the duct section.

BRIEF DESCRIPTION OF THE FIGURES

Embodiments of the invention will now be described by way of example only with reference to the figures, in which:

FIG. 9 shows a duct arrangement comprising a duct section, rotor and stator blades, each having a vortex generator surface;

DETAILED DESCRIPTION

Figure 1:
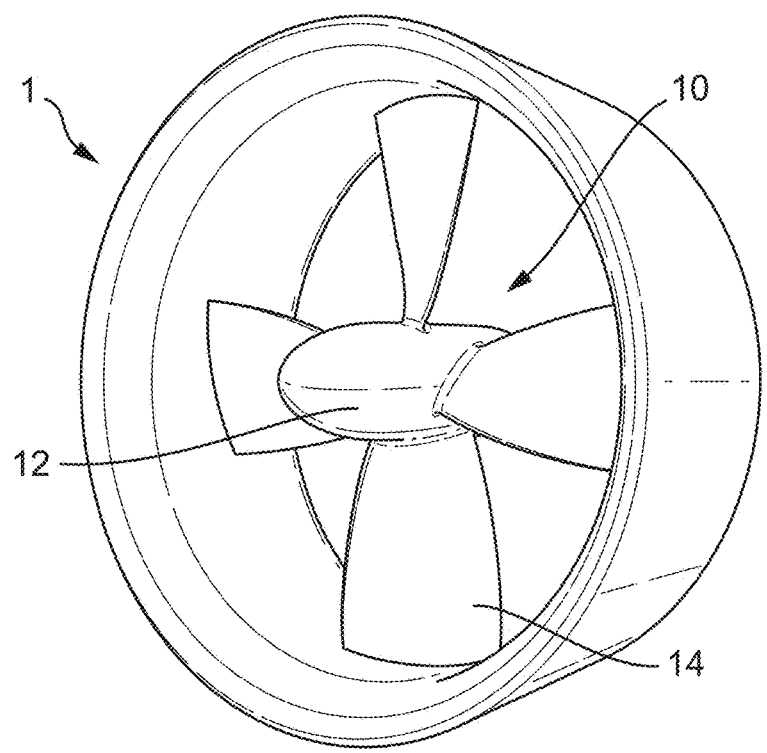
FIG. 1 shows a duct arrangement comprising a rotor.

Referring to FIG. 1, a duct arrangement 1 is shown. The duct arrangement 1 houses a rotor 10. The rotor 10 comprises a hub 12 and a plurality of rotor blades 14. The duct arrangement 1 is absent a vortex generator surface.

Figure 2:
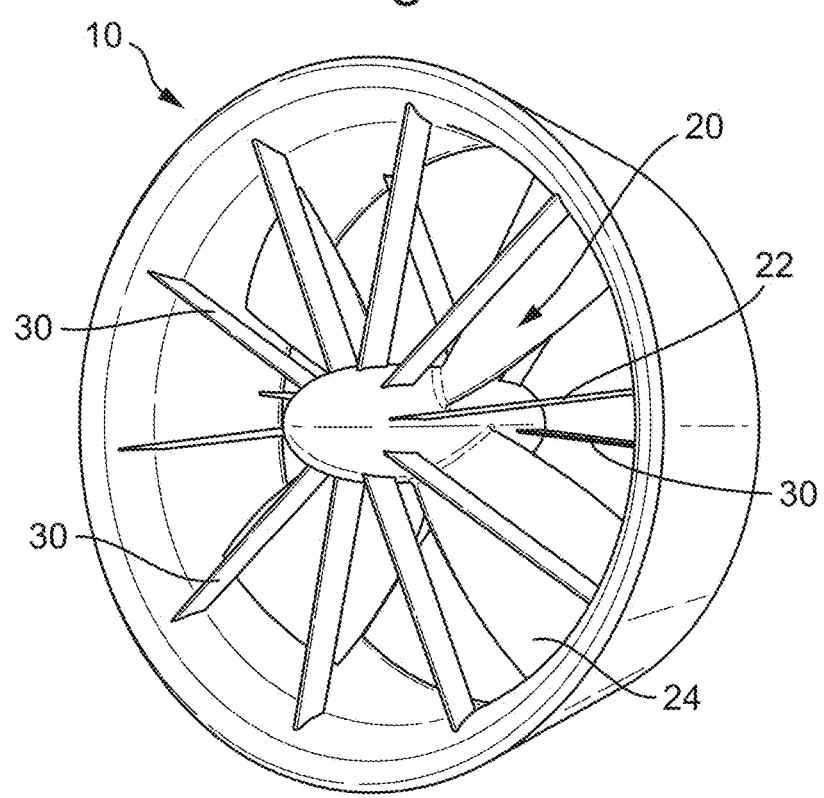
FIG. 2 shows a duct arrangement comprising stator blades.

Referring to FIG. 2, a duct arrangement 10 is shown. The duct arrangement 10 houses a rotor 20. The rotor 20 comprises a hub 22 and a plurality of rotor blades 24. The duct arrangement 10 comprises a plurality of stator blades 30. The duct arrangement 10 is absent a vortex generator surface.

Referring to FIGS. 3 to 9, duct arrangements 100 are shown. The duct arrangements 100 are for installation in an aircraft or watercraft. The watercraft may be an underwater vessel. The duct arrangements 100 comprise a first duct section 110. The first duct section 110 is a hollow cylinder, tube, or ring. In this example, the first duct section 110 is for housing, or otherwise surrounding, a rotor. The first duct section 110 houses a rotor 120. In one exemplary embodiment, the rotor 120 is a propeller rotor. In another exemplary embodiment, the rotor 120 is a turbine rotor. The rotor 120 comprises a hub 122 and a plurality of rotor blades 124.

The first duct section 110 is arranged to receive a fluid flow therethrough. The first duct section 110 comprises a fluid inlet end 112 and a fluid outlet end 114. The fluid inlet end 112 is a frontward or leading end of the first duct section 110. The fluid outlet end 114 is a rearward or trailing end of the first duct section 110. The first duct section 110 defines a first direction (indicated by arrow 116) through the first duct section 110 from the fluid inlet end 112 to the fluid outlet end 114.

The duct arrangements 100 each comprise a vortex generator surface housed in the first duct section 110. The vortex generator surface is arranged to induce vortices in the fluid flow through the first duct section 110. Each vortex generator surface comprises a plurality of projections. The term "projections" is intended to include protrusions, serrations and/or undulations, and the like. Each projection has a first extent in a lateral direction (which may be described as a length, a wavelength, or portion of a wavelength). Each projection has a second extent in a longitudinal direction (which may be described as a height, or an amplitude).

In absence of a vortex generator surface, a duct section may interact with a fluid flow therethrough to induce a first set of fluid properties. In all embodiments described herein (comprising one or more vortex generator surfaces), the provided vortex generator surface in the duct arrangement interacts with the fluid flow to induce a second set of fluid properties, the second set of fluid properties comprising an increase in vorticity magnitude of the fluid flow. The vortex generator surface is configured to induce a plurality of periodic, spaced apart, vortices, which correspond to the form of the vortex generator surface and the spacing of projections.

The generation of vortices by the vortex generator surface aid in the reduction of the vorticity magnitude o the wake produced by both the interaction of the duct arrangement with the fluid flow and also by the interaction of the rotor housed therein. Additionally, in some embodiments, flow separation on the outer surface of the first duct section is reduced when compared with a ducted propulsion unit without a vortex generator surface. This advantageously results in an increased thrust production for equivalent energy input. Overall, this provides for a more efficient propulsion unit, control of the turbulent wake, and a reduction in downstream vorticity. Furthermore, improved bollard pull performance is obtained, cavitation development is restrained, and underwater radiated noise is reduced.

Figure 3:
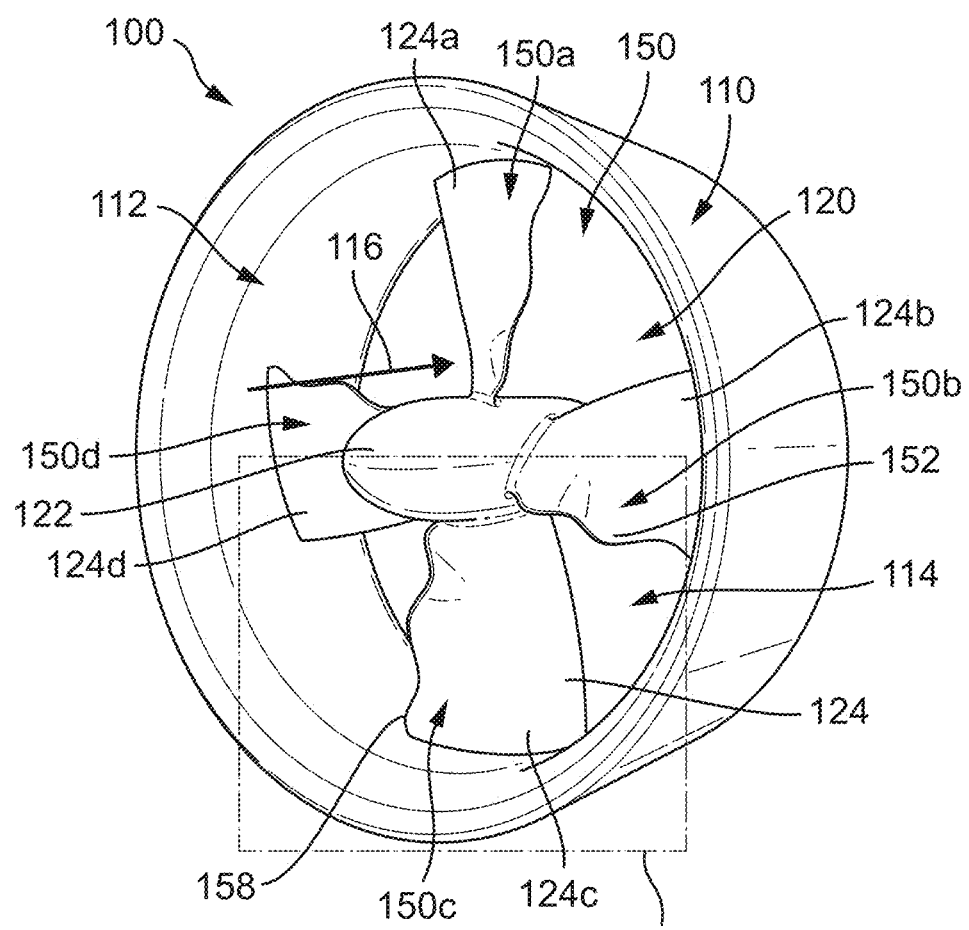
FIG. 3 shows a duct arrangement comprising a rotor having a vortex generator surface.
Figure 4:
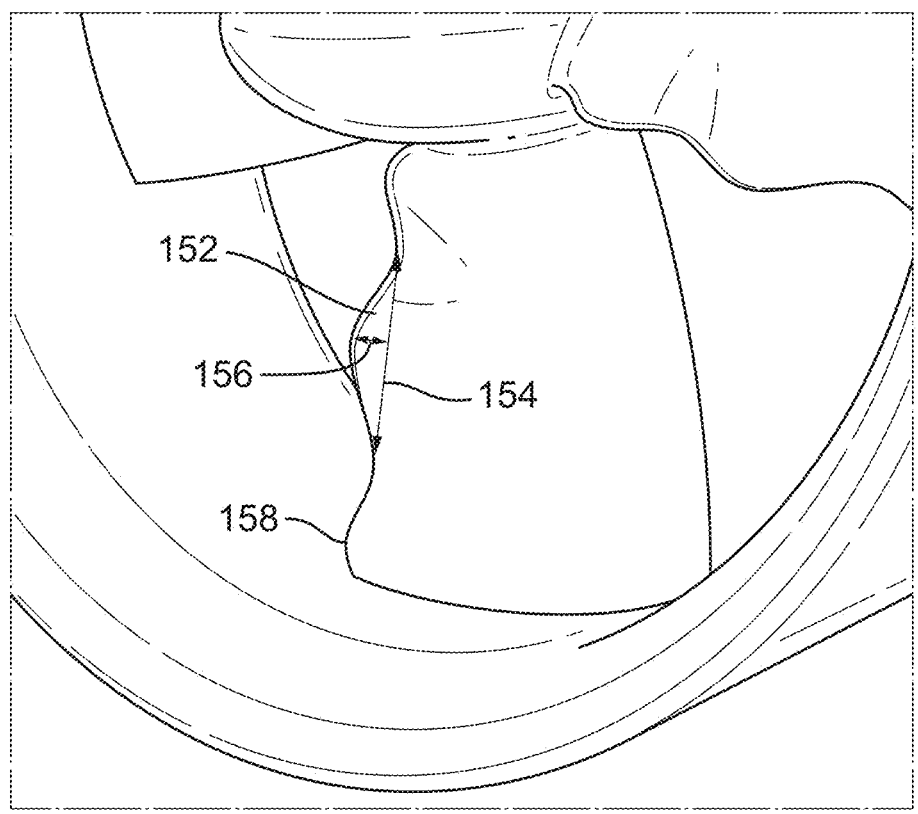
FIG. 4 shows an enlarged view of a region of FIG. 3.

Referring to FIGS. 3 and 4, a duct arrangement 100 according to a first embodiment is shown. A vortex generator surface 150 is provided only on one or more of the rotor blades 124. Specifically, the duct arrangement comprises a plurality of vortex generator surfaces 150a, 150b, 150c, 150d. One vortex generator surface is provided on each of the rotor blades 124. In this way, the rotor 120 comprises four rotor blades 124a, 124b, 124c, 124d and four corresponding vortex generator surfaces 150a, 150b, 150c, 150d.

Each vortex generator surface 150a-d extends from an edge of each rotor blade. Each vortex generator surface 150a-d is provided at or on the leading edge of each rotor blade 124a-d. Each vortex generator surface 150a-d extends from (that is, the projections 152 of the vortex generator surface 150 extend from) the leading edge of each rotor blade 124a-124d. That is, the projections 152 run along the leading edge of each rotor blade 124a-124d and extend outwardly from the leading edge thereof, which may be in the plane of the rotor blade 124a-124d. Here, the vortex generator surfaces 150a-d each comprise a series of laterally aligned projections 152. The projections 152 being laterally aligned means that they are aligned side-by-side. That is, the projections are adjacent one another. Here, the projections are aligned to form a continuous surface having a leading edge 158.

The leading edge 158 has a continuous wave-like profile, created by the rise and fall of the plurality of projections 152. The terms "wavelength" and "amplitude" used to describe the dimensions of the projections 3002 are particularly appropriate here. In FIG. 4, the wavelength is indicated at 154, and the amplitude is indicated at 156.

In some embodiments, one or more vortex generator surface 150a-d are provided at or on the trailing edge of each rotor blade 124a-d. Each vortex generator surface 150a-d extends from (that is, the projections 152 of the vortex generator surface 150 extend from) the trailing edge of each rotor blade 124a-124d. That is, the projections 152 run along the trailing edge of each rotor blade 124a-124d and extend outwardly from the trailing edge thereof, which may be in the plane of the rotor blade 124a-124d. The vortex generator surfaces 150a-d provided at the trailing edge of the rotor blades, duct sections or stator blades may be structurally identical to the vortex generator surfaces 150a-d provided at the leading edge. That is, the trailing edge vortex generator surfaces may comprise projections arranged in a similar manner, but projecting in an opposite direction to the projections at the leading edge.

Figure 5:
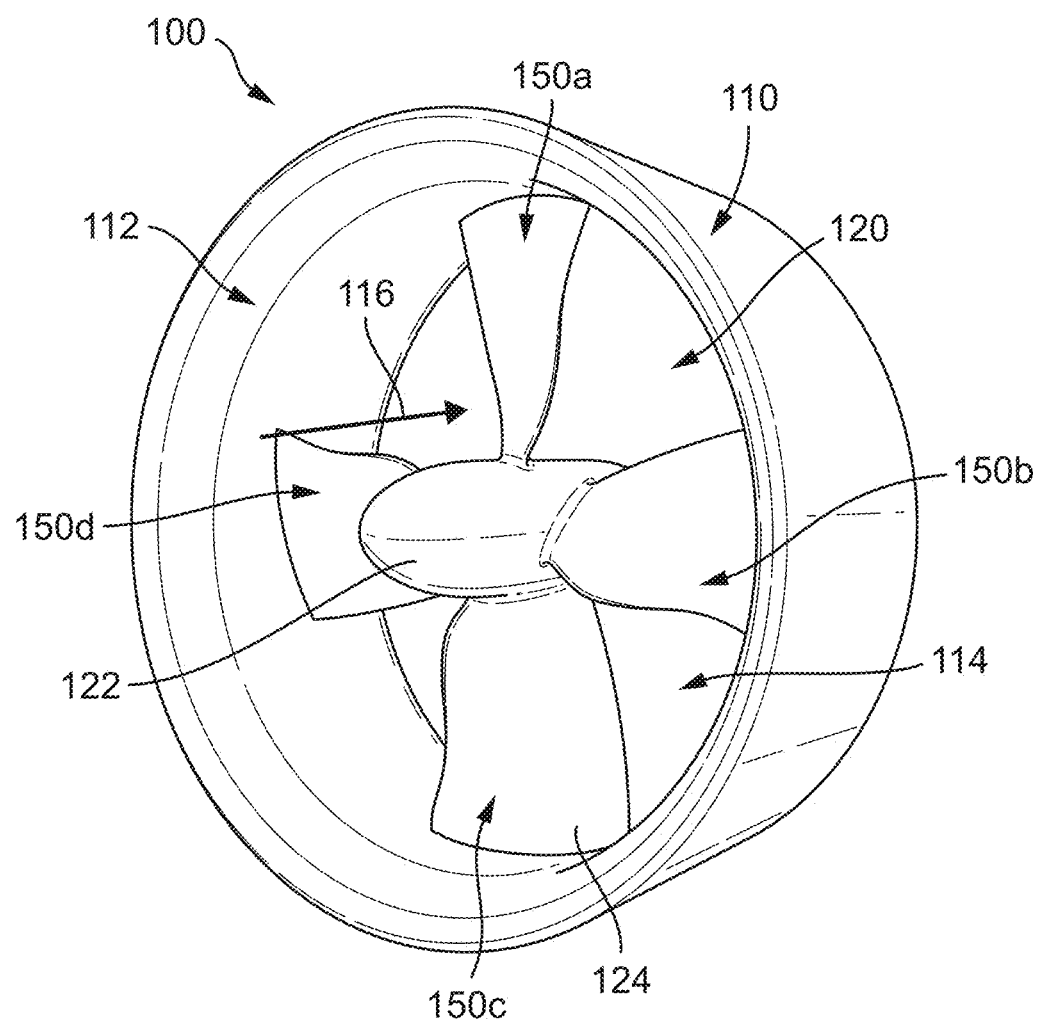
FIG. 5 shows a duct arrangement comprising a rotor having a vortex generator surface.

Referring to FIG. 5, a duct arrangement 100 according to a second embodiment is shown. The duct arrangement 100 has a vortex generator surface 150 provided only on one or more of the rotor blades 124. In the vortex generator surface 150a-150d of the duct arrangement 100 illustrated in FIG. 5, the number of projections 152 per unit length of rotor blade 124 is less than that of the vortex generator surface 150a-150d of the duct arrangement 100 shown in FIGS. 3 and 4. Aside from that difference, the duct arrangement 100 of the second embodiment and the duct arrangement 100 of the first embodiment are identical.

Figure 6:
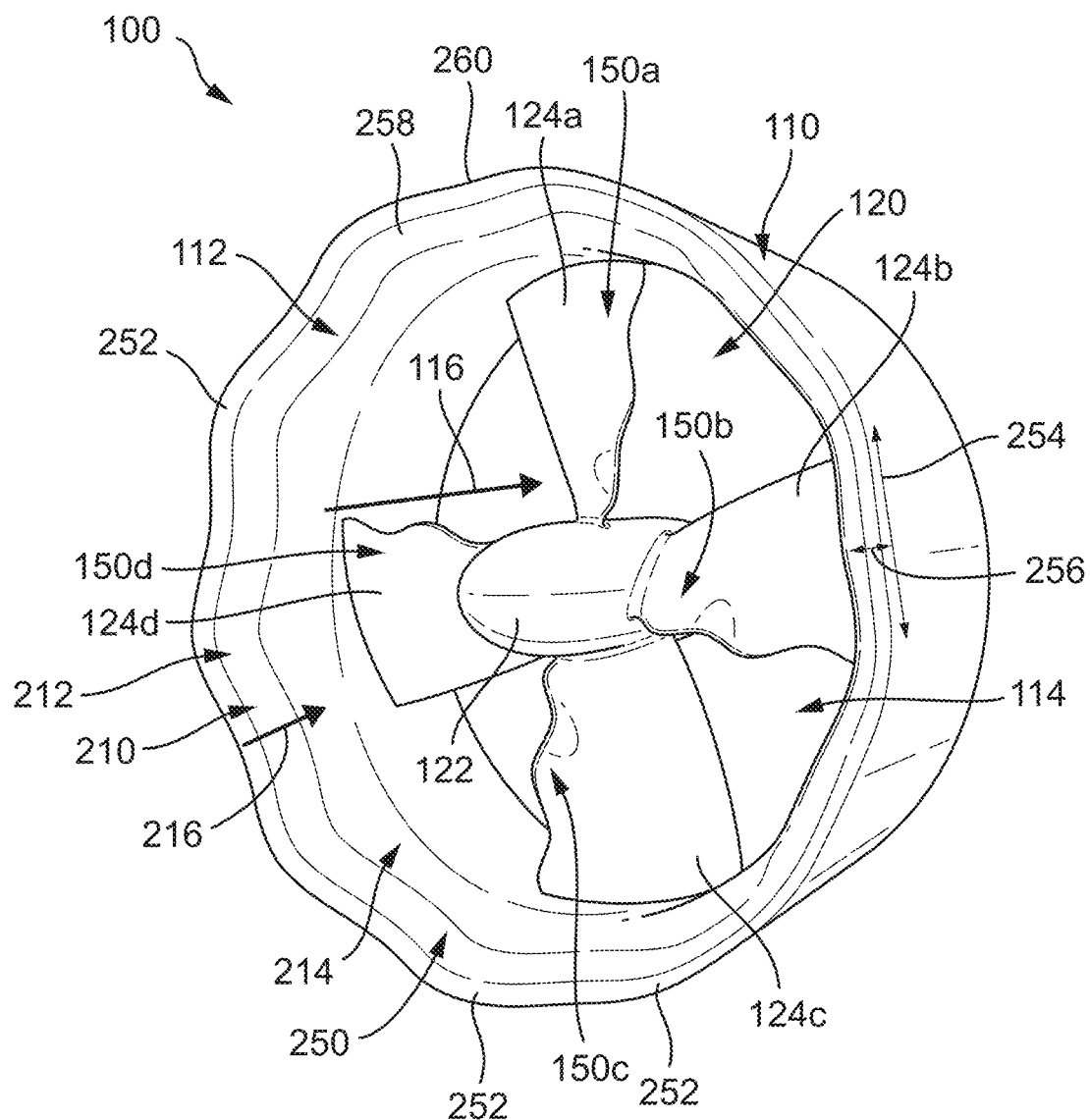
FIG. 6 shows a duct arrangement comprising a duct section having a vortex generator surface and a rotor having a vortex generator surface.

Referring to FIG. 6, a duct arrangement 100 according to a third embodiment is shown. The duct arrangement 100 further comprises a second duct section 210, in addition to all of the features of the first and second embodiments described with reference to FIGS. 3 to 5. The second duct section 210 comprises a fluid inlet end 212 and a fluid outlet end 214. The fluid inlet end 212 is a frontward, leading, end of the second duct section 210. The fluid outlet end 214 is a rearward, trailing, end of the second duct section 210 and opens into the fluid inlet end 112 of the first duct section 110. The second duct section 210 defines a second direction (indicated by arrow 216) through the second duct section 210 from the fluid inlet end 212 to the fluid outlet end 214. The second duct section 210 is provided upstream of the first duct section 110 along the first direction 116. The second duct section 210 is provided at the leading edge of the first duct section 110. The first duct section 110 houses a rotor 120 and the second duct section 210 is provided upstream of the rotor 120 along the first direction 116.

The first duct section 110 and second duct section 210 are radially and circumferentially aligned (e.g. the circumferences are substantially the same and are aligned) and are coaxial. In this manner, the first direction 116 is substantially parallel to, and substantially aligned with, the second direction 216.

In some embodiments, the first duct section 110 and second duct section 210 are separately formed. Each duct section is formed from a material well-suited to the application in question, and might typically be formed from a polymer, a metal, and so on. The first duct section 110 and second duct section 210 are bolted, adhered or otherwise fixed together and are thereby connected or attached. In this way, the second duct section 210 is supported by the first duct section 110. In one embodiment, the second duct section 210 is provided in portions of duct section and each portion is bolted to the first duct section 110 thereby to form the second duct section 210. In another embodiment, the first duct section 110 comprises a screw thread formed at a frontward end of the first duct section 110 and the second duct section 210 comprises a corresponding screw thread provided at a rearward end of the second duct section 210. The corresponding screw threads are engageable to attach the first and second duct sections 110, 210. In other embodiments, the second duct section 210 is formed integrally with the first duct section 110. In this way, the second duct section 210 is attached to the first duct section 110 and is supported by the first duct section 110.

For the avoidance of doubt, in some exemplary embodiments, a duct section may only be a region of a larger duct, tube or ring.

The second duct section 210 comprises a vortex generator surface 250. The vortex generator surface 250 is arranged to induce vortices in the fluid flow through the first duct section 110. The vortex generator surface 250 comprises a plurality of projections 252. The term "projections" is intended to include protrusions, serrations and/or undulations and so on. Each projection 252 has a first extent 254 in a lateral, circumferential direction (which may be described as a length, a wavelength, or portion of a wavelength). Each projection 252 has a second extent 256 in an axial direction (which may be described as a height, or an amplitude). The projections 252 project in a direction substantially opposite to the first direction 116. In this way, the vortex generator surface 250 is provided upstream of the rotor 120 along the first direction 116. When the vortex generator surface 250 interacts with a fluid flow, vortices are generated in the first duct section 110 in which the rotor 120 is housed. The conditions of the fluid interacting with the rotor 120 are thereby improved, so as to improve efficiency and reduce cavitation and noise generation.

The vortex generator surface 250 comprises a series of laterally aligned projections 252. The projections 252 being laterally aligned means that they are aligned side-by-side. That is, the projections are adjacent one another. Here, the projections are aligned to form a continuous surface 258 having a leading edge 260. The alignment of the projections 252 results in the foremost point of each projection being aligned in a plane. In this case, said plane is a plane which is perpendicular to the central longitudinal axis of the first and second duct sections 110, 210.

The leading edge 260 has a continuous wave-like profile, created by the rise and fall of the plurality of projections 252. The terms "wavelength" and "amplitude" used to describe the dimensions of the projections 252 are particularly appropriate here. The wavelength is indicated at 254, and the amplitude is indicated at 256. The projections 252 are curved along their length such that together the projections 252 form a ring of laterally aligned projections 252 as shown in the figure. It is worth noting that the projections extend around the circumference of the duct, and not along the duct (e.g. not along an inner or outer surface of the duct). This may improve performance, and/or simplify construction.

As mentioned above, the duct arrangement 100 of the third embodiment also comprises all of the features of the first and second embodiments described with reference to FIGS. 3 to 5. That is, the duct arrangement 100 comprises a rotor 120 having a plurality of vortex generator surfaces 150a, 150b, 150c, 150d. One vortex generator surface is provided on each of the rotor blades 124. In this way, the rotor 120 comprises four rotor blades 124a, 124b, 124c, 124d and four corresponding vortex generator surfaces 150a, 150b, 150c, 150d. The construction, shaping and/or sizing of the vortex generator surfaces 150a-d, and their location with respect to the rotor blades 124a-d is identical to that described in relation to FIGS. 2 to 4 and vortex generator surfaces 150a-d and rotor blades 124a-d.

Figure 7:
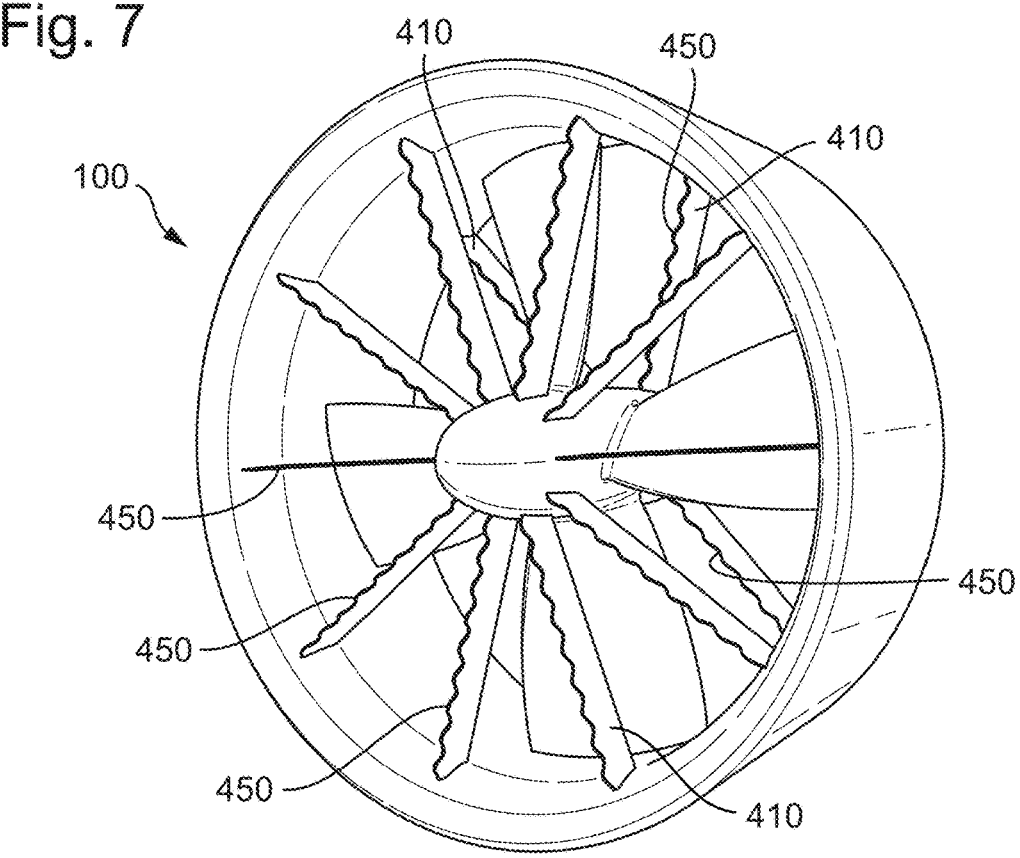
FIG. 7 shows a duct arrangement comprising stator blades having a vortex generator surface.
Figure 8:
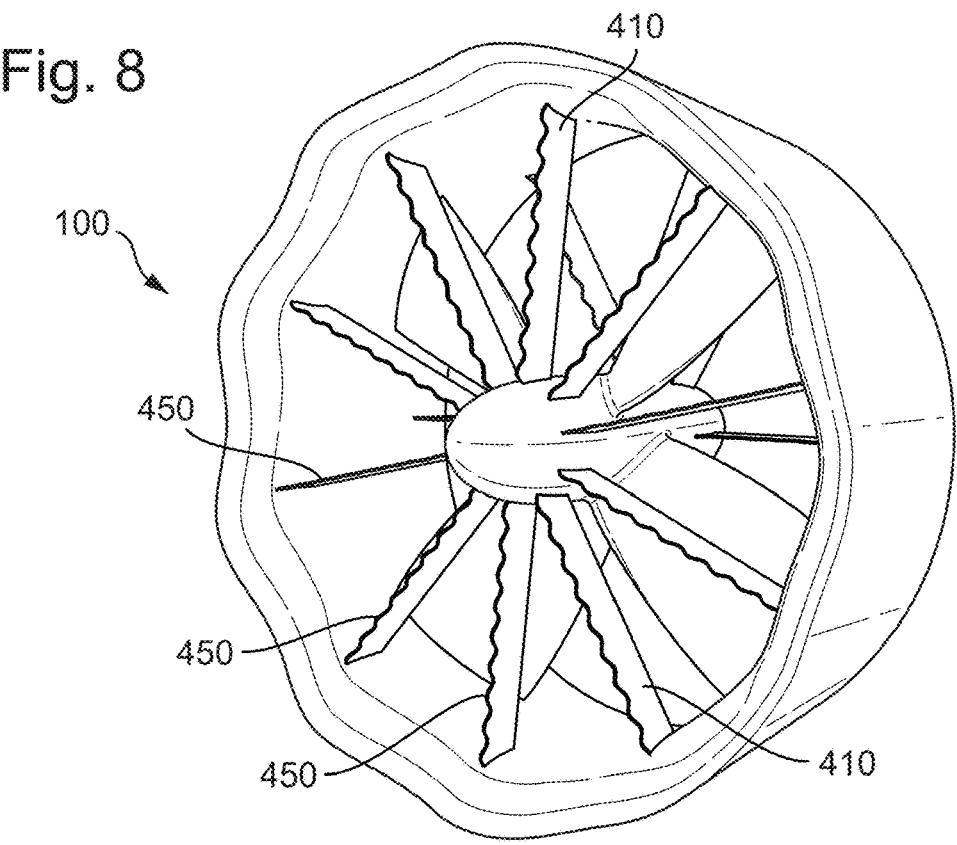
FIG. 8 shows a duct arrangement comprising a duct section having a vortex generator surface and stator blades having a vortex generator surface.

Referring to FIGS. 7 to 9, duct arrangements 100 are shown. The duct arrangements 100 each comprise stator blades 410. The stator blades 410 are housed in the first duct section 110. Each duct arrangement 100 comprises fore stator blades (that is, pre-rotor stator blades, which are upstream of the rotor) and aft stator blades (that is, post-rotor stator blades, which are downstream of the rotor).

Specifically, the duct arrangements 100 comprise a plurality of vortex generator surfaces. One vortex generator surface is provided on each of the fore stator blades and on each of the aft stator blades. In this way, the duct arrangements 100 comprises ten fore stator blades and ten aft stator blades, and ten corresponding fore vortex generator surfaces and ten corresponding aft vortex generator surfaces. The person skilled in the art will appreciate that the some of the benefits of the invention are still obtainable in absence of fore stator blades (and corresponding vortex generator surfaces) or aft stator blades (and corresponding vortex generator surfaces). Fore stator blades having vortex generator surfaces interact with the fluid to improve fluid conditions through the first duct section, thereby to improve propulsion efficiency and reduce cavitation and noise. Aft stator blades further assist in generating vortices in the wake, thereby reducing noise.

Referring to FIG. 7, a duct arrangement 100 according to a fourth embodiment is shown. A vortex generator surface 450 is provided only on the one or more stator blades 410.

Referring to FIG. 8, a duct arrangement 100 according to a fifth embodiment is shown. A vortex generator surface 450 is provided on one or more of the stator blades 410. The duct arrangement 100 comprises fore stator blades and aft stator blades. The duct arrangement 100 comprises all of the features of the duct arrangement 100 of the fourth embodiment described with reference to FIG. 7. The duct arrangement 100 further comprises a second duct section 210 comprising a vortex generator surface 250 in accordance with the third embodiment as described herein with reference to FIG. 6.

Referring to FIG. 9, a duct arrangement 100 according to a sixth embodiment is shown. A vortex generator surface 650 is provide on one or more of the stator blades 410. The duct arrangement comprises fore stator blades and aft stator blades. The duct arrangement 100 comprises all of the features of the duct arrangement 100 of the fifth embodiment described with reference to FIG. 8. That is, the duct arrangement 100 comprises fore stator blades and aft stator blades with corresponding vortex generator surfaces, and a second duct section 210 comprising a vortex generator surface 250 in accordance with the third embodiment as described herein with reference to FIG. 6. The duct arrangement 100 further comprises a vortex generator surfaces provided on one or more of the rotor blades, in accordance with the first and second embodiments as described herein with reference to FIGS. 3 to 5.

Figure 10A:
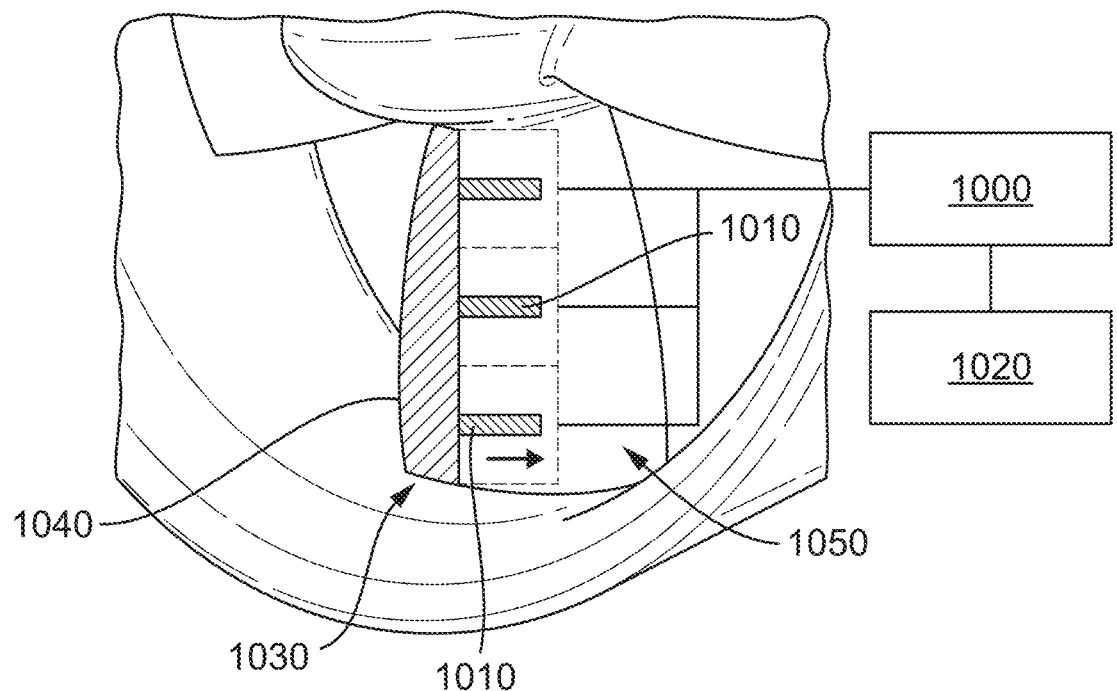
FIG. 10a shows a duct arrangement in a first configuration.
Figure 10B:
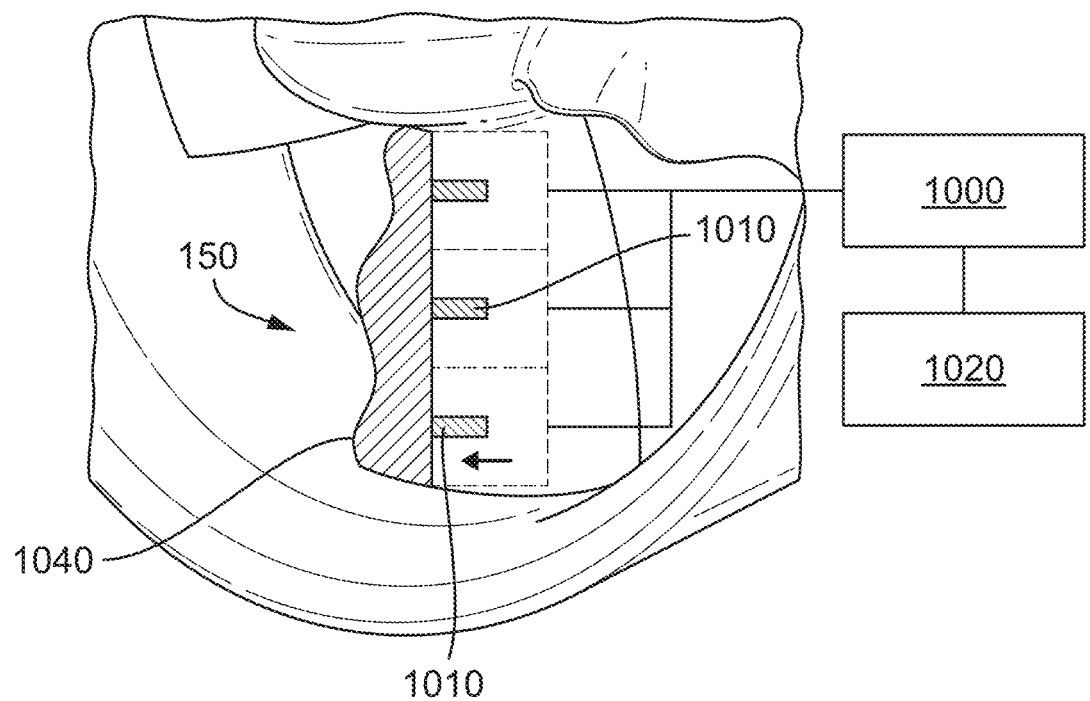
FIG. 10b shows a duct arrangement in a second configuration.

Referring to FIG. 10, a duct arrangement 100 according to a seventh embodiment is shown. In the duct arrangement 100, the rotor blades (of which only one is shown) are selectively configurable to provide a vortex generator surface 150. The vortex generator surface 150 is provided to induce vortices in the fluid flow. In one exemplary embodiment, the fluid flow is a liquid flow (e.g. as opposed to air flow).

It will be understood by the person skilled in the art that the construction described herein in relation to the selectively configurable nature of the vortex generator surfaces 150 provided on the rotor blades of the duct arrangement 100 is also applicable to providing vortex generator surfaces 450 on stator blades 410 and/or vortex generator surfaces 250 at a second duct section 210, where these are provided, for example in the duct arrangements 100 of the fourth or fifth embodiments.

The duct arrangement 100 is configurable in a configuration wherein the vortex generator surface is not provided, and thereby does not interact with the fluid flow to induce vortices therein. The duct arrangement is selectively configurable in a configuration wherein the vortex generator surface is provided, and thereby interacts with the fluid flow to induce vortices therein. The duct arrangement is selectively configurable in a configuration wherein the vortex generator surface is provided, to a certain extent or degree (e.g. partially) and thereby interacts with the fluid flow to induce vortices therein to a certain extent or degree. Advantageously, this allows the duct arrangement to be configured to provide the vortex generator surface when it is deemed desirable or necessary to induce vortices in the fluid flow using the vortex generator surface. Advantageously, this also allows the vortex generator surface to be removed, or otherwise not provided to interact in the fluid flow, which can be beneficial to reduce drag or increase the craft wake where appropriate. These benefits have, in particular, not been contemplated or realisable in a liquid (e.g. water) environment. This is surprising, given the benefits that are possible from such an application.

The duct arrangement 100 further comprises a controller 1000. The controller 1000 is arranged to implement the selective configuration of the vortex generator surface 150. That is, in this exemplary embodiment, the controller 1000 controls actuators to extend or expand, or retract or contract when it is necessary or desirable to provide the vortex generator surface 150. For example, the controller can implement the selective configuration of the vortex generator surface 150 following:

a. A user command;
b. Input from an additional sensor arrangement 1020, for example, a sensor arrangement operable to measure and detect turbulent flows, craft velocities and/or fluid flow velocities or the like; and/or
c. Environmental conditions, for example, levels of turbulence, proximity to other craft, time of day, altitude or the like.

The rotor blades 124 comprise a first section 1030 comprising a resilient membrane 1040 and an actuator assembly 1010. The actuator assembly 1010 is operable to adjust the profile of the resilient membrane to provide the vortex generator surface.

The rotor blades further comprise a second section 1050. The first section 1030 and second section 1050 are movable relative to one another to provide the vortex generator surface 150.

The resilient membrane 1040 is provided in sections across the leading edge of the second section 1050. The actuator assembly 1010 comprises a plurality of linear actuators, one actuator for each section of resilient membrane 1040. In the retracted position, the actuators extend back into the second section 1050.

Actuating the actuators 1010 causes them to extend away from the second section 1050 to contact and force the resilient membrane sections away from the second section 1050, thereby providing a vortex generator surface 150 comprising a series of projections at the leading edge of the second section 1050.

Whilst the embodiment described above comprises an actuator assembly 1010 and a resilient membrane 1040, other constructions selectively configurable to provide a vortex generator surface 150 are suitable. For example, in one exemplary embodiment, the first section comprises a shape memory alloy, and the application of heat, for example a heated fluid, causes the shape memory alloy to deform to provide a series of projections. In another exemplary embodiment, the first section may comprise rigid projection members, and a resilient biasing means, or indeed an actuator assembly similar to that described above, can cause the projection members to extend from the second section and/or retract into the second section.

The advantages of vortex generator surfaces are quantified with references to the following non-limited examples provided below. Whilst the examples provided relate to vortex generator surfaces provided on duct sections and rotor blades, the person skilled in the art will appreciate that similar advantages are obtainable by use of a vortex generator surface with stator blades.

Figure 11:
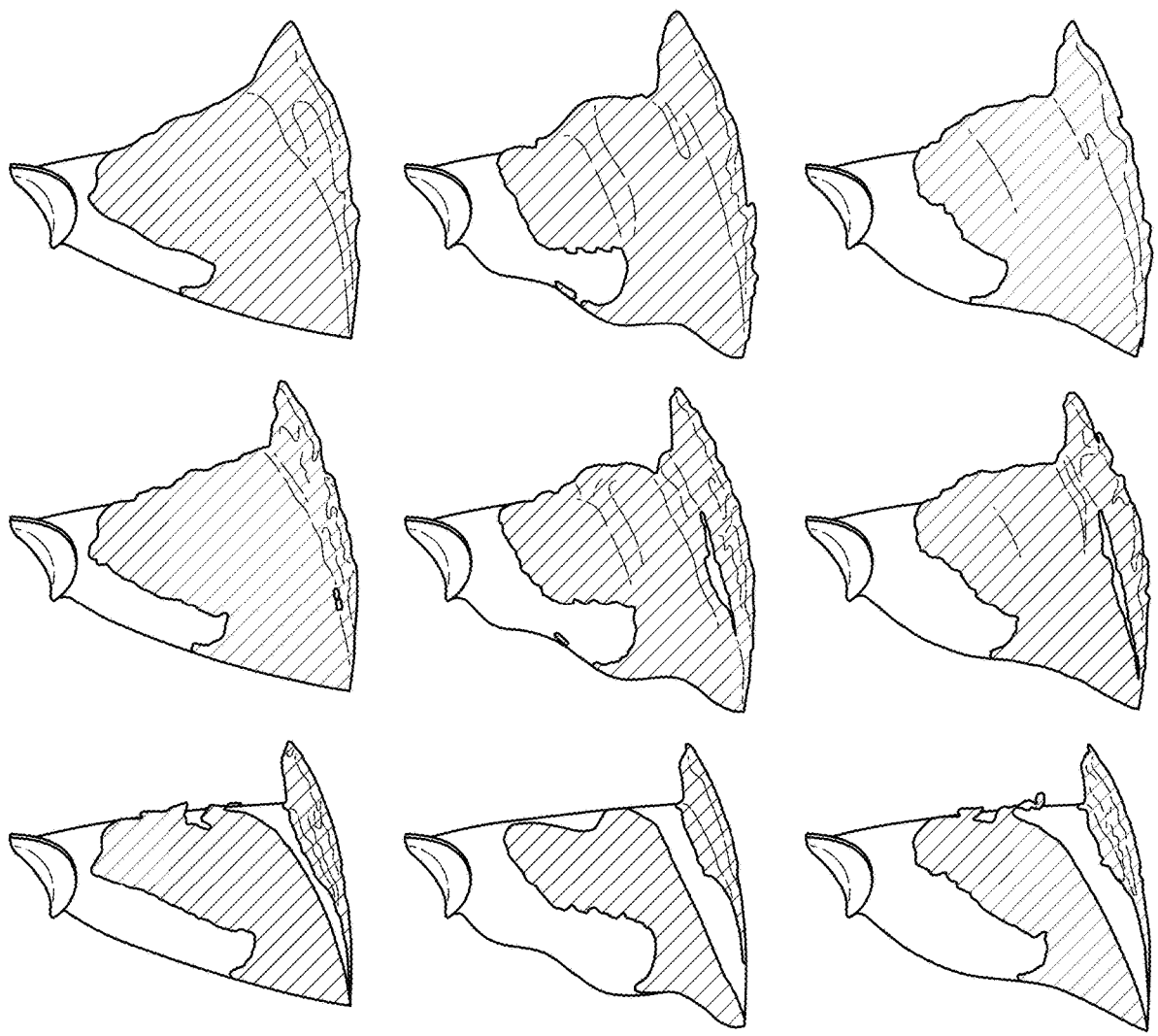
FIG. 11 shows cavitation resulting from interaction of rotors with a fluid flow.

FIG. 11 shows rotor blades interacting with fluid flows. The left-hand column illustrates fluid flow interaction with a reference rotor blade, without a vortex generator surface.

The central and right-hand columns illustrate fluid flow interaction with rotor blades having vortex generator surfaces. The dark shaded areas are regions of cavitation. It can be seen that cavitation is reduced by the provision of the vortex generator surfaces. It has been found that the cavitation development can be reduced by around 50% compared to a propeller absent a vortex generator surface. The total thrust coefficient can be enhanced by 10% using a propeller having a vortex generator surface. At the same thrust coefficient, the propulsive efficiency in heavy cavitating conditions can be improved by 45%.

Figure 12:
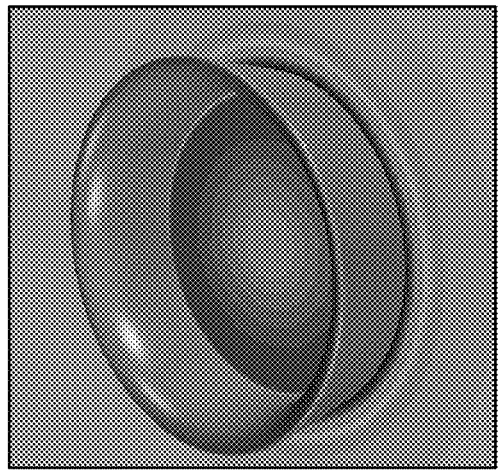
FIG. 12 shows interactions of the duct section of FIG. 1 with a fluid flow.
Figure 14:
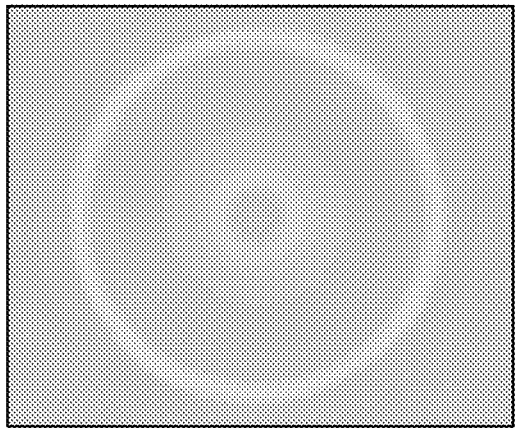
FIG. 14 shows interaction of the duct section of FIG. 1 with a fluid flow.

FIGS. 12 and 14 show a first duct and propeller interacting with a fluid flow (Example 1). The duct and propeller are shaped and sized so as to have a first set of geometrical parameters. The person skilled in the art will appreciate that the geometrical parameters suitable for a duct and propeller arrangement depends on the specific application and use of the arrangement. The concentric rings surrounding the outside of the duct in FIG. 12 indicate drag induced by the leading edge of the duct. In FIG. 14, a ring-shaped streamwise wake pattern can be seen, indicated by the continuous ring surrounding the duct.

Figure 13:
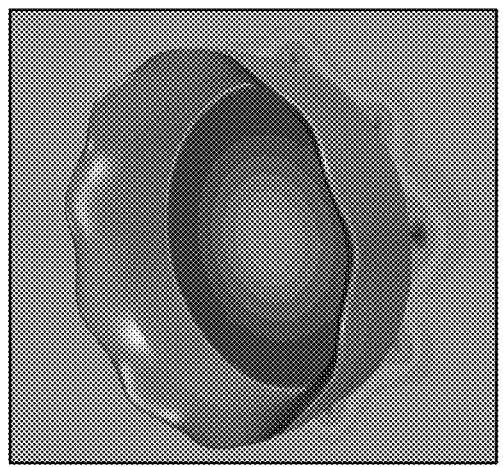
FIG. 13 shows interaction of the duct section of FIG. 6, 8, 9 with a fluid flow.
Figure 15:
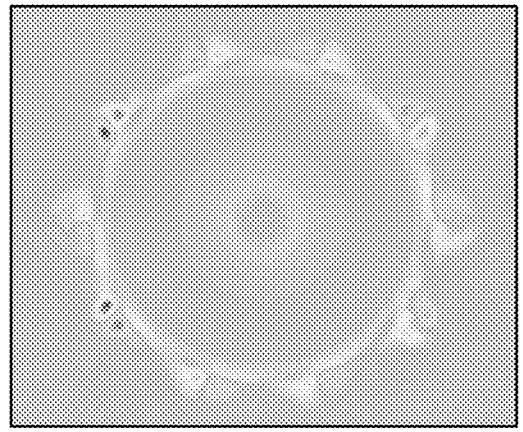
FIG. 15 shows interaction of the duct section of FIG. 6, 8, 9 with a fluid flow.

FIGS. 13 and 15 show a second duct and propeller interacting with a fluid flow (Example 2). The second duct and propeller have identical geometrical parameters to the first duct and propeller of FIGS. 12 and 14. In FIGS. 13 and 15, in addition to the duct and propeller, a vortex generator surface is provided at the leading edge of the duct.

As can be seen in FIG. 13, regions of drag are compartmentalised at periodic intervals about the circumference of the duct. This is due to the provision of the vortex generator surface. As a result, this creates less overall drag when compared with the duct and propeller of Example 1. In this example, there is a 50% reduction in total drag.

As can be seen in FIG. 15, counter rotating streamwise vortices are induced by the vortex generator surface, whereas they were not in Example 1 above. As can be seen in the figure, the vortices are spatially separated, i.e. spaced apart, about the circumference of the duct. That is, the vortex generator surface is configured to induce a plurality of spaced apart vortices. The vortices induced are periodic.

The induced vortices aid in the reduction in the magnitude of the wake. Comparing FIGS. 12 and 13, whilst the duct is shown to interact with the fluid flow, resulting in a first set of fluid properties (for example, a first wake pattern), the vortex generator surface interacts with the fluid flow to induce a second set of fluid properties (for example, a second wake pattern). As shown in FIG. 15, the second set of fluid properties may include an increase in the vorticity magnitude of the fluid flow, which surprisingly reduces the vorticity magnitude of the wake.

Additionally, flow separation on the outer surface of the duct in Example 2 is lower than that of Example 1, as a result of the provision of the vortex generator surface. This advantageously results in increased thrust production for equivalent energy input. Overall, this provides for a more efficient propulsion unit, control of the turbulent wake, and a reduction in downstream vorticity. Furthermore, improved bollard pull performance is obtained, cavitation development is restrained, and underwater radiated noise is reduced.

Figure 16:
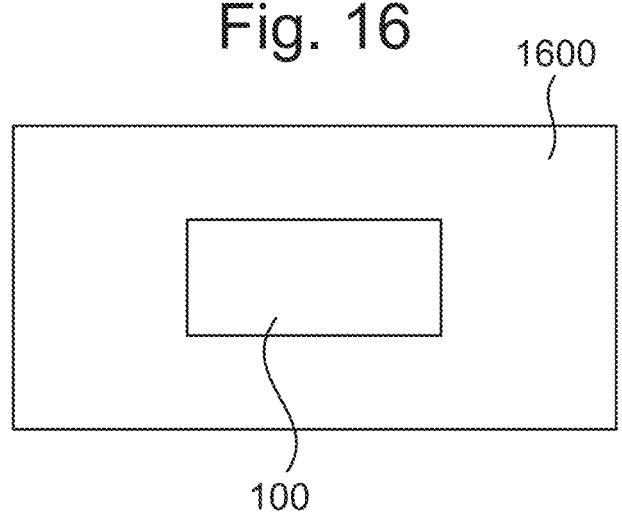
FIG. 16 shows general methodology principles.

Referring to FIG. 16, an aircraft or watercraft 1600 is shown having a duct arrangement 100 according to any embodiment described herein.

Figure 17:
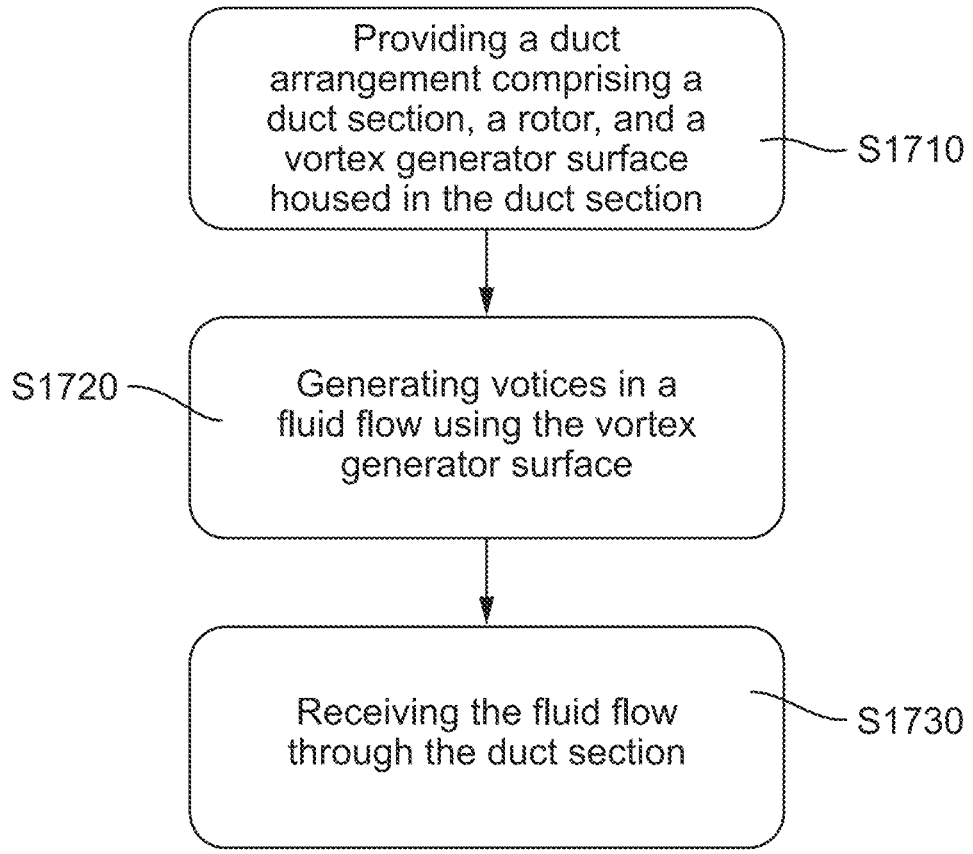
FIG. 17 shows a method of influencing fluid flow.

Referring to FIG. 17, a method of influencing fluid flow is shown. Step S1610 comprises providing a duct arrangement comprising a duct section, a rotor and a vortex generator surface housed in the duct section. Step S1620 comprises generating vortices in a fluid flow using the vortex generator surface. Step S1630 comprises receiving the fluid flow through the duct section.

The duct arrangements described herein could be made or manufactured as a completely new, standalone entity in certain examples. However, at least some implementations could be readily retrofitted to realise the above advantages, for example retrofitting a vortex generator surface as discussed herein, to an existing flow influencing surface or object, or moving an existing vortex generator surface to a different location, and so on.

As above, it will be appreciated that the aspects and embodiments are closely linked and interrelated, and different features of any one aspect or embodiment could sometimes be used in addition with, on in place of, a feature of another aspect or embodiment.

The invention claimed is:

1. A duct arrangement for influencing a liquid flow, the duct arrangement comprising:
    a first duct section arranged to receive the liquid flow therethrough, the first duct section defining a first direction through the first duct section from a liquid inlet end to a liquid outlet end;
    a rotor housed in the first duct section, the rotor comprising one or more rotor blades;
    a first vortex generator surface housed in the first duct section and on a respective one of the one or more rotor blades, the first vortex generator surface having projections which extend from a leading edge of the one or more rotor blades in a continuous wave-like profile, the first vortex generator surface arranged to induce vortices in the liquid flow through the first duct section; and
    a second duct section defining a second direction through the second duct section from a liquid inlet end to a liquid outlet end, the second duct section comprising a second vortex generator surface at the liquid inlet end having curved projections in a direction opposite to the first direction forming a continuous surface with a leading edge of the second duct section having a wave-like profile, wherein the second vortex generator surface is arranged to induce vortices in the liquid flow downstream through the first duct section.

2. The duct arrangement according to claim 1, wherein the first vortex generator surface is one of a plurality of first vortex generator surfaces, and wherein the one or more rotor blades comprises a plurality of rotor blades, and each first vortex generator surface is provided on a respective one of the rotor blades.

3. The duct arrangement according to either of claim 1, wherein the first vortex generator surface is further provided at or on the trailing edge of the respective one of the one or more rotor blades.

4. The duct arrangement according to claim 1, wherein the second vortex generator surface is provided upstream of the rotor along the first direction.

5. The duct arrangement according to claim 4, wherein a third vortex generator surface is provided on one or more stator blades.

6. The duct arrangement according to claim 1, wherein the second vortex generator surface is in the form of a ring.

7. The duct arrangement according to claim 1, wherein the second duct section is attached to, supported by and/or is formed integrally with, the first duct section.

8. The duct arrangement according to claim 1, wherein the first duct section, the second duct section, the respective one of the one or more rotor blades, and/or a stator blade is selectively configurable to provide the first and/or second vortex generator surface to induce vortices in the liquid flow.

9. The duct arrangement according to claim 8, wherein the respective one of the one or more rotor blades comprises a first rotor blade section, the duct arrangement comprising a second rotor blade section, wherein the first rotor blade section and the second rotor blade section are moveable relative to one another to provide the first vortex generator surface and/or second vortex generator surface.

10. The duct arrangement according to claim 9, wherein the first rotor blade section is movable away from and/or toward the second rotor blade section.

11. A watercraft comprising a duct arrangement according to claim 1.

12. A method of influencing a liquid flow, the method comprising:
providing a duct arrangement comprising a first duct section, a rotor, first vortex generator surface, and a second duct section including a second vortex generator surface, the first duct section arranged to receive the liquid flow therethrough, the rotor housed in the first duct section and including a rotor blade, the first vortex generator surface housed in the first duct section and on the rotor blade of the rotor, the first vortex generator surface having projections which extend from a leading edge of the rotor blade in a continuous wave-like profile, the second vortex generator surface having curved projections forming a continuous surface with a leading edge of the second duct section having a wave-like profile, and the first and second vortex generator surfaces arranged to induce vortices in the liquid flow downstream through the first duct section;
generating vortices in the liquid flow using the first and second vortex generator surfaces; and
receiving the liquid flow through the first and second duct sections.

13. The method according to claim 12, wherein the first vortex generator surface is one of a plurality of first vortex generator surfaces, and wherein the rotor blade is one of a plurality of rotor blades, and each first vortex generator surface is provided on a respective one or more of the one or more rotor blades, and wherein each of first vortex generator surfaces is configured to induce vortices in the liquid flow through the first duct section.

14. A duct arrangement for generating vortices in a liquid flow to reduce a vorticity magnitude of a wake, the duct arrangement comprising:

a first duct section arranged to receive the liquid flow therethrough, the first duct section defining a first direction through the first duct section from a liquid inlet end to a liquid outlet end;
a rotor housed in the first duct section, the rotor comprising a rotor blade;
a first vortex generator surface housed in the first duct section and provided on the rotor blade, the first vortex generator surface having projections which extend from a leading edge of the rotor blade in a continuous wave-like profile, the first vortex generator surface arranged to induce vortices in the liquid flow through the first duct section; and
a second duct section defining a second direction through the second duct section from a liquid inlet end to a liquid outlet end, the second duct section comprising a second vortex generator surface at the liquid inlet end, wherein the second vortex generator surface has curved projections in a direction opposite to the first direction forming a continuous surface with a leading edge of the second duct section having a wave-like profile arranged to induce vortices in the liquid flow downstream through the first duct section, the second duct section being provided upstream of the rotor along the first direction.

15. The duct arrangement according to claim 14, wherein the first vortex generator surface is one of a plurality of first vortex generator surfaces, and wherein the rotor blade is one of a plurality of rotor blades, and each first vortex generator surface is provided on a respective one or more of the one or more rotor blades, and wherein each of first vortex generator surfaces is configured to induce vortices in the liquid flow through the first duct section.

16. The duct arrangement according to claim 14, wherein the second vortex generator surface is provided upstream of the rotor along the first direction.

17. The duct arrangement according to claim 14, wherein an additional vortex generator surface is provided on a stator blade upstream of the rotor and/or an additional vortex generator surface is provided on a stator blade downstream of the rotor.

18. The duct arrangement according to claim 14, wherein the second duct section is attached to, or formed integrally with, the first duct section, and the second vortex generator surface is in the form of a ring.

* * * * *